United States Patent [19]

Hirozawa et al.

[11] 4,241,012
[45] Dec. 23, 1980

[54] ANTIFREEZE CONTAINING AMINO SILANES, AMINO SILOXANES AND A HYDROXYBENZOIC ACID

[75] Inventors: Stanley T. Hirozawa, Birmingham, Mich.; Edward F. O'Brien, Cromwell, Conn.; Joe C. Wilson, Belleville, Mich.

[73] Assignee: BASF Wyandotte Corporation, Wyandotte, Mich.

[21] Appl. No.: 78,307

[22] Filed: Sep. 24, 1979

Related U.S. Application Data

[62] Division of Ser. No. 464, Jan. 2, 1979.

[51] Int. Cl.³ .................. C09K 15/32; C23F 11/06; C23F 11/10
[52] U.S. Cl. .................................... 422/13; 252/73; 252/75; 252/76; 252/77; 252/78.1; 252/78.3; 252/389 R; 252/396; 422/7; 422/17
[58] Field of Search .................. 422/7, 13, 14, 17; 252/73, 75, 76, 77, 78.1, 78.3, 389 R

[56] References Cited

U.S. PATENT DOCUMENTS

| | | | |
|---|---|---|---|
| 2,094,564 | 9/1937 | Schenck et al. | 252/73 |
| 2,411,676 | 11/1946 | Burghart | 422/7 X |
| 3,203,969 | 8/1965 | Pines et al. | 252/75 X |
| 3,234,144 | 2/1966 | Morehouse | 422/7 X |

*Primary Examiner*—Barry S. Richman
*Attorney, Agent, or Firm*—Andrew E. Pierce

[57] ABSTRACT

This invention relates to single-phase antifreeze or coolant concentrates comprising (1) an alcohol, (2) at least one of an amino siloxane, an amino silane or both an amino siloxane and an amino silane and a siloxane of the formula:

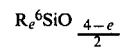

wherein $R^6$ is a monovalent hydrocarbon group and e has a value of from 1 to 3, and (3) a hydroxybenzoic acid basic pH buffer preferably comprising para or ortho hydroxybenzoic acid or mixtures thereof. The concentrates are preferably used, upon dilution with about 30 to about 90 percent by weight of water based upon the weight of said concentrate, as antifreeze compositions for internal combustion engines. The alcohol is preferably ethylene glycol. The coolant compositions are effective in providing protection against corrosion of all metals and alloys used in industrial heat exchangers and are especially effective in inhibiting the corrosion of aluminum internal combustion engine and radiator components.

3 Claims, No Drawings

ANTIFREEZE CONTAINING AMINO SILANES, AMINO SILOXANES AND A HYDROXYBENZOIC ACID

This is a division of application Ser. No. 000,464, filed Jan. 2, 1979.

BACKGROUND OF THE INVENTION

Field of the Invention

This invention relates to alcohol based antifreeze compositions containing corrosion inhibitors for use primarily in water-circulating systems such as internal combustion engines, heat exchangers, cooling towers, and the like.

2. Description of the Prior Art

Antifreeze concentrates containing alcohols such as ethylene glycol are commonly diluted with water to prepare cooling system compositions for internal combustion engines in order to depress the freezing point of water. It is known that the alcohols utilized gradually decompose in the cooling system to produce acidic products which lower the pH of the coolant. It is also known that metallic surfaces in internal combustion engines which are in contact with such coolants become seriously corroded and that the corrosion becomes progressively worse as the pH of the coolant decreases. The recent tendency toward the use of aluminum in internal combustion engines, for instance, aluminum cylinder heads, aluminum water pumps and aluminum radiator cores, requires improved corrosion resistant antifreeze compositions which are capable of retarding the corrosion of metals which are in contact with such coolants.

It has also been recognized in the art that corrosion resistant antifreeze compositions are most desirably single-phase systems which have good shelf stability such that when such concentrates reach the consumer prior to dilution with water to form the coolant composition, such compositions contain the proper proportion of each phase and exhibit no gelation.

Numerous antifreeze compositions are known in the art which contain corrosion inhibitors and inhibitors for preventing decomposition of the alcohol utilized, for instance, ethylene glycol. These corrosion inhibitors and stabilizers for alcohol decomposition include both organic materials and inorganic materials. Illustrative of the organic materials that have been used in antifreeze compositions are guanadine, citrates, coal tar derivatives, petroleum bases, thiocyanates, peptones, phenols, thioureas, tannin, quinoline, morpholine, triethanolamine tartrates, glycol mono-ricinoleate, organic nitrites, mercaptans, sulfonated hydrocarbons, fatty oils, triazoles, mercaptobenzothiazoles, phenothiazine, and piperazine. Illustrative of the inorganic materials that have been used as corrosion inhibitors are sulfates, sulfides, fluorides, hydrogen peroxide, alkali metal chromates, nitrites, phosphates, borates, tungstates, molybdates, carbonates, and silicates.

Silicates, particularly alkali metal silicates and certain silicones and silicate-silicone copolymers, have been suggested for use in antifreeze compositions to retard the corrosion of metal surfaces of internal combustion engines as disclosed in U.S. Pat. Nos. 3,341,469; 3,337,496; 3,312,622; 3,198,820; 3,203,969; 3,248,329; 3,265,623; 3,121,692; and others. While it has been found that compositions containing metal silicates are effective corrosion inhibitors for metals in internal combustion engines, especially aluminum, the use of metallic silicates in antifreeze compositions is disadvantageous since these compositions have poor shelf life and/or use life, that is, a tendency to gel and form precipitates on standing prior to dilution of antifreeze concentrates by the consumer or during use as a coolant. With respect to the water-soluble organo-silicones and water-soluble silicate-silicone copolymers which have been suggested for use in antifreeze compositions, it has been found that it would be desirable in such systems if greater reserve alkalinity could be incorporated into the system thereby reducing the corrosion tendency.

In U.S. Pat. No. 2,832,742, there is disclosed an ethylene glycol base coolant for use in automobile radiators containing a corrosion inhibiting composition composed of equal parts of para tertiary butyl benzoic acid and a high molecular weight aliphatic carboxylic acid derived from a petroleum fraction. In U.S. Pat. No. 2,197,774 there is disclosed the use of aromatic nitrohydroxy compounds wherein the nitro and hydroxy groups are directly attached to the aromatic nucleus or positioned only on a side chain. In Canadian Pat. No. 990,060 there is disclosed ethylene glycol based antifreeze compositions containing alkali metal silicates and alkali metal nitrites as corrosion inhibitors which are buffered at a pH of about 9 to about 10.5. There is no indication in any of these references that para hydroxybenzoic acid or mixtures thereof are effective pH buffers and corrosion inhibitors for alcohol-based coolants.

SUMMARY OF THE INVENTION

There are disclosed single-phase antifreeze and coolant concentrates comprising an alcohol selected from the group consisting of methanol, ethanol, propanol, ethylene glycol, diethylene glycol, triethylene glycol, propylene glycol and glycerol and a corrosion inhibiting amount of at least one of an amino siloxane, an amino silane or both an amino siloxane and an amino silane and a siloxane of the formula:

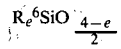

wherein $R^6$ is a monovalent hydrocarbon group and e has a value of 1 to 3 and, as an organic basic pH buffer, a hydroxybenzoic acid preferably selected from the group consisting of ortho hydroxybenzoic acid, para hydroxybenzoic acid, and mixtures thereof.

Preferably said alcohol is ethylene glycol and preferably the antifreeze concentrates are utilized as coolants upon dilution with water in internal combustion engines including those engines containing aluminum parts, for instance, aluminum cylinder heads. By the incorporation of the hydroxybenzoic acid of the invention into antifreeze compositions containing metal silicates or silicone-silicate copolymers, the pronounced tendency of the metal silicates to gel can be overcome and the tendency for the silicone or silicone-silicate corrosion inhibitors to suffer a loss in reserve alkalinity can be overcome thus adding to the corrosion resistance of these compositions when used as antifreeze compositions or coolants for internal combustion engines. The organic pH buffers of the invention are especially advantageous as compared to the inorganic sodium borates and potassium borates.

DESCRIPTION OF THE PREFERRED EMBODIMENTS

The compositions of this invention contain a novel corrosion inhibiting organic basic pH buffer which is a hydroxybenzoic acid or mixture thereof, preferably para hydroxybenzoic acid. The ortho and meta forms as well as the dihydroxybenzoic acids, i.e., 2,6- and 2,4-dihydroxybenzoic acids are useful. The use of such buffers serves to maintain the pH of the antifreeze or coolant composition above a pH of about 9 to about 11, preferably a pH above about 9.5 to 10.5 in order to minimize corrosion which increases with the decreasing pH of the antifreeze system. Additionally, where a water-soluble metal silicate copolymer is utilized as a component of the antifreeze composition, the buffering of the pH by the hydroxybenzoic acid compounds of the invention serves to maintain reserve alkalinity of the system. While many basic buffers have been used in the past in antifreeze compositions to maintain the pH above 7, the borate salt buffers preferred in the prior art antifreeze compositions such as sodium tetraborate, sodium orthoborate, and sodium metaborate are ineffective in maintaining reserve alkalinity during use where the antifreeze composition contains water-soluble organosiloxane polymers.

The amount of the hydroxybenzoic acid basic pH buffer utilized in the compositions of the invention depends to some extent upon the desired shelf life of the antifreeze concentrate containing the buffer, the effectiveness of the particular buffer, and the proportions of the other components of the antifreeze concentrate composition. Generally, amounts of the buffer compositions of the invention range from about 0.1 percent to about 1.5 percent by weight, preferably about 0.5 percent to about 1.2 percent by weight based upon the weight of the the antifreeze concentrates of the invention. The use of lesser amounts of the buffers of the invention can result in a significant decrease in the pH of the coolant in a relatively short use time whereas the use of greater amounts of the buffer can involve the expenditure of needless amounts of money and possibly lead to insolubility problems. No advantage is generally gained by departing from the indicated proportions or from the use of additional basic buffer materials known in the prior art.

The alcohols that are suitable for use in preparing the antifreeze and cooling compositions of the invention include both monohydric alcohols and polyhydric alcohols. Thus, methanol, ethanol, and propanol as well as ethylene glycol, diethylene glycol, triethylene glycol, propylene glycol and glycerol are useful. Mixtures of these alcohols are also useful in the compositions of this invention. Ethylene glycol is an especially useful alcohol. The alcohol and coolant concentrates of the invention are useful as a heat transfer medium in the cooling systems of internal combustion engines both undiluted or upon dilution with relatively large amounts of water. The antifreeze concentrates of the invention are adapted to economical shipment and storage; the concentrate being shipped to the point where it is to be used in diluted form as a coolant. Water imparts desirable properties to both the concentrate and coolant compositions of the invention since small amounts of water tend to lower the freezing point of the concentrate composition and large amounts of water improve the heat transfer properties of the coolant compositions. The antifreeze concentrate compositions of the invention can contain about 0.1 percent by weight to about 10 percent by weight of water based upon the weight of the concentrate. The concentrates preferably contain about 1 to about 5 percent of water based upon the weight of the alcohol. Generally the coolant compositions contain about 30 percent to about 90 percent by weight of water based upon the total weight of the coolant. The pH of both the antifreeze concentrate compositions of the invention and the coolants diluted with the above larger amounts of water generally should be maintained at greater than about 9 to about 11 in order that corrosion of metals with which the compositions come in contact will be minimized. Any alkali such as the alkali metal hydroxides can be used to adjust pH.

Various additives known in the prior art can be added to the antifreeze concentrate compositions of the invention or to the coolant compositions in order to impart special properties thereto. For instance, antifoam agents, identifying dyes, pH indicators, conventional corrosion and alcohol or glycol oxidation inhibitors known in the prior art, sealants which prevent leakage of the coolant from the coolant system, anticreep agents which prevent seepage of the coolant into the crankcase of the internal combustion engine and the like can be added to either or both the antifreeze concentrates of the inventions of the diluted coolant compositions of the invention. It should be noted that, while the antifreeze and coolant compositions of this invention are single-phase compositions, the addition of various additives insoluble in the alcohol or in water can render these compositions two-phase (for instance, the addition of an insoluble sealant additive which prevents leakage of the coolant from the cooling system). While the antifreeze concentrates and coolant compositions of this invention are particularly suitable for use either alone or upon dilution with water as coolants suitable for use in the cooling system of an internal combustion engine, the compositions can be advantageously employed in other applications such as heat transfer fluids or hydraulic fluids.

The organosilicon corrosion inhibitors used in the concentrates of the invention are used in a corrosion inhibiting amount and preferably are present in said concentrates in the amount of 0.01 percent to 10 percent by weight based upon the weight of said concentrate and include both hydrocarbonoxysilanes and siloxanes containing an amino group. The hydrocarbonoxysilanes include alkoxysilanes and aroxysilanes. The siloxanes containing an amino group are linked to a silicon atom through a divalent hydrocarbon group containing at least 3 carbon atoms wherein the amino group is attached to at least the third carbon removed from the silicon atom. Mixtures of each of the above siloxanes and silanes with siloxanes having the formula:

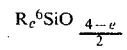

$$R_e^6 SiO_{\frac{4-e}{2}}$$

are useful. In this formula, $R^6$ is a monovalent hydrocarbon group and e has a value from 1 to 3. The useful compositions are generally described as follows:

(a) hydrocarbonoxysilanes consisting essentially of silanes represented by the formula:

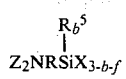

(1)

wherein Z is a member selected from the group consisting of the hydrogen atom, monovalent hydrocarbon groups, substituted monovalent hydrocarbon groups containing a substituent selected from the group consisting of the hydroxyl, amino, amido, ester, hydrocarbonoxy and cyano groups and divalent groups that are derived from oxirane compounds by the opening of the oxirane ring and that link the nitrogen atom to the silicon atom through a carbon to carbon to nitrogen bond; R is a divalent hydrocarbon group containing at least three carbon atoms; the $Z_2N-$ group is attached to at least the third carbon removed from the silicon atom; $R^5$ is a member selected from the group consisting of the monovalent hydrocarbon groups and the $NH_2C_nH_{2n}-$ groups where n has a value of at least 3; X is a member selected from the group consisting of the alkoxy and aroxy groups; b has a value from 0 to 2; f has a value from 0 to 2 and represents the number of said divalent groups represented by Z; and (3-b-f) has a value from 1 to 3;

(b) siloxanes consisting essentially of siloxane groups represented by the formula:

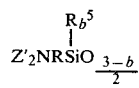

(2)

wherein Z' is a member selected from the group consisting of the hydrogen atom, monovalent hydrocarbon groups, substituted monovalent hydrocarbon groups containing substituents selected from the group consisting of hydroxyl, amino, amido, ester, cyano, and hydrocarbonoxy groups and R, $R^5$ and b have the above-defined meanings; or (c) siloxanes consisting essentially of both the above-defined siloxane groups and siloxane groups having the formula:

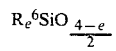

(3)

wherein $R^6$ is a monovalent hydrocarbon group and e has a value from 1 to 3.

Illustrative of the siloxane homopolymers that are useful as inhibitors in this invention are gamma-aminopropyl(methyl)siloxane cyclic trimer and tetramer, delta-aminobutyl(methyl)siloxane cyclic trimer and tetramer, linear, hydroxy end-blocked, delta-aminobutyl(methyl) polysiloxanes, gamma-aminopropylpolysiloxanes, bis-(delta-aminobutyl)tetramethyldisiloxane and delta-aminobutylpolysiloxane.

Illustrative of the siloxane copolymers that are useful as inhibitors in this invention are bis(trimethylsiloxy)-gamma-aminopropyl(methyl)trisiloxane, copolymers containing dimethylsiloxy and gamma-aminopropyl(methyl)siloxy or delta-aminobutyl(methyl)siloxy groups, copolymers containing gamma-aminopropylsiloxy and phenylsiloxy, methylsiloxy or vinylsiloxy groups, copolymers containing delta-aminobutylsiloxy and phenylsiloxy groups or amylsiloxy groups, copolymers containing N,N-di(beta-hydroxyethyl)-delta-aminobutyl(methyl)siloxy and dimethylsiloxy groups.

Additional representative examples of compounds under these generic formulas together with methods of preparing these compounds can be found in U.S. Pat. No. 3,121,692, incorporated herein by reference.

The reserve alkalinity of an antifreeze composition, as referred to elsewhere in the specification, is defined as a measure of the ability of the antifreeze composition to resist a decrease in pH due to the presence of acidic materials such as are produced by the decomposition of ethylene glycol. Reserve alkalinity is determined by titrating a sample (about 10 cc) of the composition with 0.1 Normal aqueous hydrochloric acid solution. The reserve alkalinity is computed from calculating the number of milliliters of acid that would be required to neutralize 100 milliliters of the composition from the number of milliliters of acid actually required to neutralize the sample.

When not otherwise specified throughout this specification and claims, temperatures are given in degrees centigrade and parts, percentages and proportions are by weight.

The embodiments of the invention in which an exclusive property or privilege is claimed are defined as follows:

1. In a process for inhibiting the corrosion of metals that come in contact with an aqueous alcohol-based antifreeze or coolant composition, the improvement wherein said composition consists essentially of a mixture of water and an antifreeze or coolant concentrate consisting essentially of an alcohol, a corrosion inhibitor, and a hydroxybenzoic acid pH buffer wherein said concentrate contains a corrosion inhibitor, present in the proportion of 0.01 percent to 10 percent by weight of said concentrate, and selected from the group consisting of:

(a) hydroxycarbonoxysilanes represented by the formula:

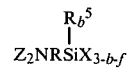

wherein Z is a member selected from the group consisting of the hydrogen atom, monovalent hydrocarbon groups, substituted monovalent hydrocarbon groups containing a substituent selected from the group consisting of the hydroxyl, amino, amido, ester, hydrocarbonoxy and cyano groups and divalent groups that are derived from oxirane compounds by the opening of the oxirane ring and that link the nitrogen atom to the silicon atom through a carbon to carbon to nitrogen bond; R is a divalent hydrocarbon group containing at least three carbon atoms; the $Z_2N-$ group is attached to at least the third carbon removed from the silicon atom; $R^5$ is a member selected from the group consisting of the monovalent hydrocarbon groups and the $NH_2C_nH_{2n}-$ groups where n has a value of at least 3; X is a member selected from the group consisting of the alkoxy and aroxy groups; b has a value from 0 to 2; f has a value from 0 to 2 and represents the number of said divalent groups represented by Z; and (3-b-f) has a value from 1 to 3;

(b) siloxanes consisting essentially of siloxane groups represented by the formula:

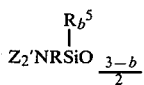

wherein Z' is a member selected from the group consisting of the hydrogen atom, monovalent hydrocarbon groups, substituted monovalent hydrocarbon groups containing substituents selected from the group consisting of hydroxyl, amino, amido, ester, cyano and hydrocarbonoxy groups and R, $R^5$ and b have the above-defined meanings; and (c) siloxanes consisting essentially of both the above-defined siloxane groups and silane groups having the formula:

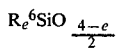

wherein $R^6$ is a monovalent hydrocarbon group and e has a value from 1 to 3, wherein said alcohol is selected from the group consisting of methanol, ethanol, propanol, ethylene glycol, diethylene glycol, triethylene glycol, propylene glycol and glycerol, and wherein said pH buffer serves to maintain the pH above about 9 to about 11 and is selected from the group consisting of ortho and para hydroxybenzoic acid and mixtures thereof and is present in the proportion of about 0.1 to about 1.5 percent by weight based upon the weight of said concentrate.

2. The process of claim 1 wherein said concentrate contains as an additional component about 0.1 percent to about 10 percent by weight of water based upon the weight of said concentrate.

3. The process of claim 2 wherein said alcohol is ethylene glycol and said coolant contains about 30 percent to about 90 percent by weight of water based upon the total weight of said coolant.

* * * * *